(12) United States Patent
Portal et al.

(10) Patent No.: US 7,752,636 B1
(45) Date of Patent: Jul. 6, 2010

(54) SYSTEM AND METHOD FOR UNIFORM DATA TRANSFER FROM DIFFERENT INTERFACES OF INPUT/OUTPUT DEVICES

(75) Inventors: Christian A. Portal, Holliston, MA (US); David T. Leffingwell, Hopedale, MA (US)

(73) Assignee: The MathWorks, Inc., Natick, MA (US)

( * ) Notice: Subject to any disclaimer, the term of this patent is extended or adjusted under 35 U.S.C. 154(b) by 748 days.

(21) Appl. No.: 11/633,038

(22) Filed: Dec. 4, 2006

(51) Int. Cl.
G06F 3/00 (2006.01)
G06F 9/44 (2006.01)
G06F 9/46 (2006.01)
G06F 13/00 (2006.01)

(52) U.S. Cl. .................................... 719/329
(58) Field of Classification Search ................. 719/329
See application file for complete search history.

(56) References Cited

U.S. PATENT DOCUMENTS

| | | | | |
|---|---|---|---|---|
| 5,857,087 A | * | 1/1999 | Bemanian et al. | 710/305 |
| 6,282,589 B1 | * | 8/2001 | Porterfield et al. | 710/52 |
| 6,453,356 B1 | * | 9/2002 | Sheard et al. | 709/231 |
| 6,741,608 B1 | * | 5/2004 | Bouis et al. | 370/465 |
| 7,183,910 B2 | * | 2/2007 | Alvarez et al. | 340/539.13 |
| 2007/0229520 A1 | * | 10/2007 | Miller et al. | 345/530 |

OTHER PUBLICATIONS http://msdn2.microsoft.com/en-us/library/ms786508(d=printer).aspx last accessed on Feb. 28, 2007.
http://msdn2.microsoft.com/en-us/library/ms783354(d=printer).aspx last accessed on Feb. 28, 2007.
http://msdn2.microsoft.com/en-us/library/ms778825(d=printer).aspx last accessed on Feb. 28, 2007.
http://msdn2.microsoft.com/en-us/library/ms778903(d=printer).aspx last accessed on Feb. 28, 2007.

* cited by examiner

*Primary Examiner*—Hyung S Sough
*Assistant Examiner*—KimbleAnn Verdi
(74) *Attorney, Agent, or Firm*—Venable LLP; Michael A. Sartori; Christopher Ma

(57) ABSTRACT

In a computer-implemented method for transferring data, data is received from an external source, the data comprising a plurality of units. Each unit of the data is formatted into a formatted data unit having a first format. A full buffer is formed by storing the formatted data units in a data buffer. Contents of the full buffer is provided to an internal data sink, wherein the internal data sink is configured to provide the data units of the full buffer to a data converter, the data converter providing the data units to one or more external data sinks in an associated external data sink compatible format.

29 Claims, 16 Drawing Sheets

SYSTEM AND METHOD FOR UNIFORM DATA TRANSFER FROM DIFFERENT INTERFACES OF INPUT/OUTPUT DEVICES

CROSS-REFERENCE TO RELATED APPLICATIONS

The following patent application incorporated herein by reference in its entirety, is mentioned:

U.S. patent application Ser. No. 10/671,703 "Object-Oriented Data Transfer System for Data Sharing", by Dean et al., filed on Sep. 26, 2003.

BACKGROUND

The following relates to techniques and systems for data transfer.

Computer-aided test and measurement systems typically communicate with external input/output (I/O) devices, such as data acquisition hardware, image acquisition devices, and scientific instruments. Such I/O devices typically are associated with different interfaces. Consequently, a separate data transfer solution has often been necessary for each I/O device, which can involve much redundancy and, thus, duplicated effort, additional memory space allocations and processing capacity, etc.

SUMMARY

In accordance with one aspect, a computer-implemented method for transferring data is disclosed. Data is received from an external source, the data comprising a plurality of units. Each unit of the data is formatted into a formatted data unit having a first format. A full buffer is formed by storing the formatted data units in a data buffer. Contents of the full buffer is provided to an internal data sink, wherein the internal data sink is configured to provide the data units of the full buffer to a data converter, the data converter providing the data units to one or more external data sinks in an associated external data sink compatible format.

In accordance with another aspect, a computer-readable medium comprising software that, when executed by a computer system, causes the computer system to perform operations for transferring data, is disclosed. Data is received from an external source, the data comprising a plurality of units. Each unit of the data is formatted into a formatted data unit having a first format. A full buffer is formed by storing the formatted data units in a data buffer. Contents of the full buffer is provided to an internal data sink, wherein the internal data sink is configured to provide the data units of the full buffer to a data converter, the data converter providing the data units to one or more external data sinks in an associated external data sink compatible format.

In accordance with another aspect, a system comprising a computer and a computer-readable medium, the computer-readable medium comprising software that, when executed by the computer, causes the computer to perform operations for transferring data, is disclosed. Data is received from an external source, the data comprising a plurality of units. Each unit of the data is formatted into a formatted data unit having a first format. A full buffer is formed by storing the formatted data units in a data buffer. Contents of the full buffer is provided to an internal data sink, wherein the internal data sink is configured to provide the data units of the full buffer to a data converter, the data converter providing the data units to one or more external data sinks in an associated external data sink compatible format.

In accordance with another aspect, a system for transferring data is disclosed. A means receives data from an external data source, the data comprising a plurality of units. A means formats each unit of the data into a formatted data unit having a first format. A means forms a full buffer by storing the formatted data units in a data buffer. A means provides contents of the full buffer to an internal data sink, wherein the internal data sink is configured to provide the data units of the full buffer to a data converter, the data converter providing the data units to one or more external data sinks in an associated external data sink compatible format.

In accordance with another aspect, a system for transferring data is disclosed. An adaptor data source receives data comprising a plurality of data units from an external data source, formats each data unit into a first format, and stores the formatted data units in a data buffer to obtain a full buffer. An internal data sink is coupled to the adaptor data source to receive the data units of the full buffer. A data converter is coupled to the internal data sink to receive the data units of the full buffer, the data converter converting the received data units into an external data sink compatible format.

In accordance with another aspect, a computer-implemented method for transferring data is disclosed. Data is received by an internal data source, the data having a plurality of data units. Each unit of the data is formatted into a formatted data unit having a first format. A full buffer is formed by storing the formatted data units in a data buffer. Contents of the full buffer is provided to an adaptor data sink, wherein the adaptor data sink is configured to provide the data units of the full buffer to one or more external data sinks in an associated external data sink compatible format.

In accordance with another aspect, a computer-readable medium comprising software that, when executed by a computer system, causes the computer system to perform operations for transferring data, is disclosed. Data is received by an internal data source, the data having a plurality of data units. Each unit of the data is formatted into a formatted data unit having a first format. A full buffer is formed by storing the formatted data units in a data buffer. Contents of the full buffer is provided to an adaptor data sink, wherein the adaptor data sink is configured to provide the data units of the full buffer to one or more external data sinks in an associated external data sink compatible format.

In accordance with another aspect, a system comprising a computer and a computer-readable medium, the computer-readable medium comprising software that, when executed by a computer system, causes the computer system to perform operations for transferring data, is disclosed. Data is received by an internal data source, the data having a plurality of data units. Each unit of the data is formatted into a formatted data unit having a first format. A full buffer is formed by storing the formatted data units in a data buffer. Contents of the full buffer is provided to an adaptor data sink, wherein the adaptor data sink is configured to provide the data units of the full buffer to one or more external data sinks in an associated external data sink compatible format.

In accordance with another aspect, a system for transferring data is disclosed. A means receives data comprising a plurality of data units. A means formats each unit of the data into a formatted data unit having a first format. A means forms a full buffer by storing the formatted data units in a data buffer. A means provides contents of the full buffer to an adaptor data sink, wherein the adaptor data sink is configured to provide the data units of the full buffer to one or more external data sink in an associated external data sink compatible format.

In accordance with another aspect, a system for transferring data is disclosed. An input data converter receives data which includes a plurality of data units. An internal data source is coupled to the input data converter to receive the data units, format the data units into a first format, and store the formatted data units in a buffer to obtain a full buffer. An adaptor data sink interfaces with an external data sink, the adaptor data sink receiving the data units of the full buffer from the internal data source, and converting the data units of the full buffer to a format compatible with an external data sink.

BRIEF DESCRIPTION OF THE DRAWINGS

Various embodiments of the present application will be understood and appreciated more fully from the following detailed description, taken in conjunction with the drawings, in which.

DEFINITIONS

Figure 1:
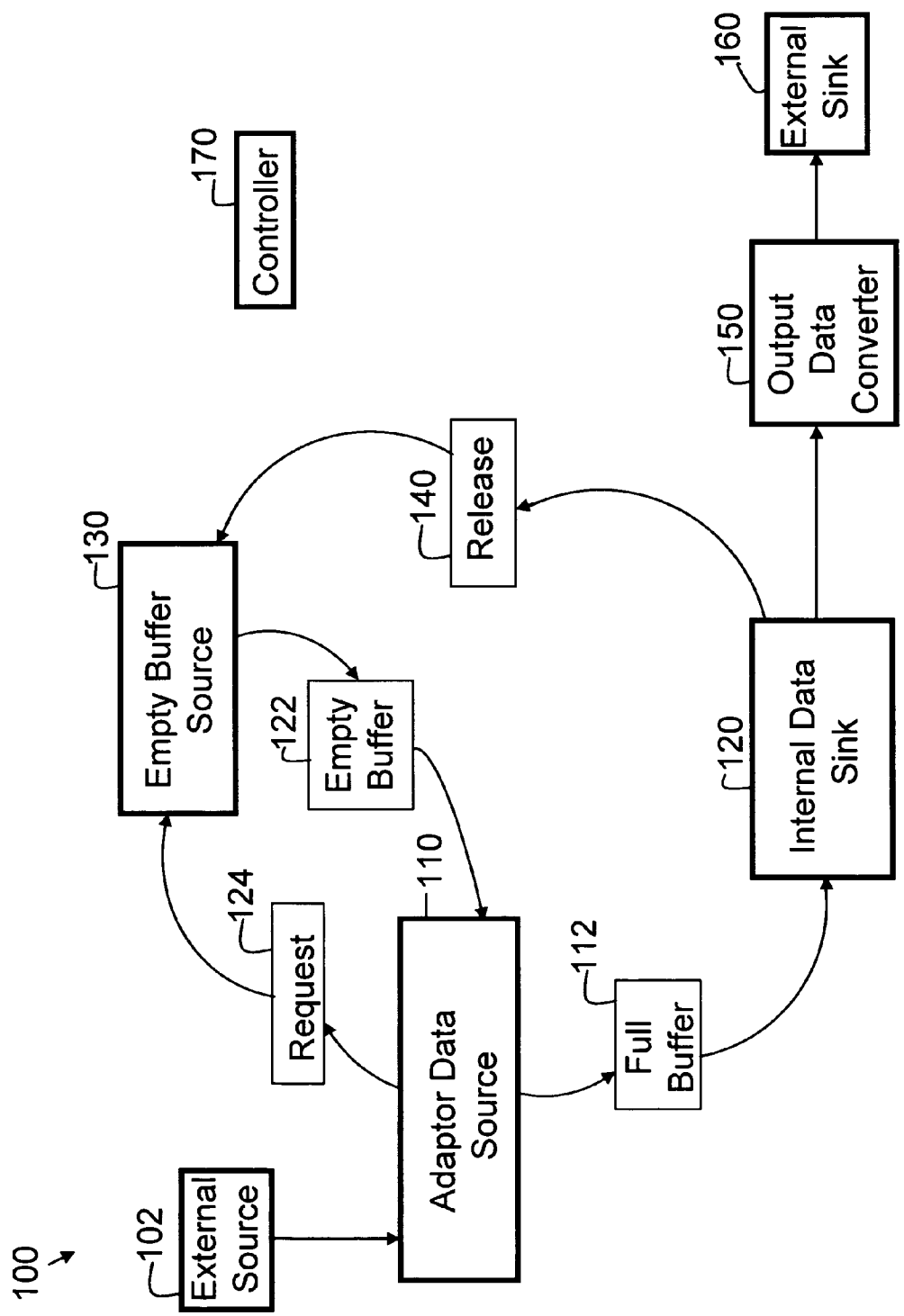
FIG. 1 is a diagrammatic illustration of an exemplary data transfer system according to an exemplary embodiment of the invention.

In following description, the following definitions are applicable throughout (including above).

A "computer" may refer to one or more apparatus and/or one or more systems that are capable of accepting a structured input, processing the structured input according to predetermined rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with interne access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; a quantum computer; a biological computer; and an apparatus that may accept data, may process data in accordance with one or more stored software programs, may generate results, and typically may include input, output, storage, arithmetic, logic, and control units.

"Software" may refer to predetermined rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; and a memory chip.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

DETAILED DESCRIPTION

Exemplary embodiments of the invention are described in detail below. While specific exemplary embodiments are discussed, it should be understood that this is done for illustration purposes only. In describing and illustrating the exemplary embodiments, specific terminology is employed for the sake of clarity. However, the following is not intended to be limited to the specific terminology so selected. A person skilled in the relevant art will recognize that other components and configurations may be used without parting from the spirit and scope of the application. It is to be understood that each specific element includes all technical equivalents that operate in a similar manner to accomplish a similar purpose. The examples and embodiments described herein are non-limiting examples.

With reference to FIG. 1, in an exemplary data transfer engine 100, data which includes a plurality of data units may be obtained from an external data source 102 and processed for forwarding to various desired data sinks. In general, "source" is used herein to describe a source of data, relative to at least one other component, and "sink" is used herein to describe a data destination, relative to at least one other component. It should be noted that the same component may act in some contexts as a source and in other contexts as a sink. Examples of the external data sources include, but are not limited to, hardware, data files, sockets, etc. Such external data sources, e.g., hardware, may have associated device drivers or other interface software that interfaces directly with the internal data sources.

For example, an adaptor data source, internal data source, adaptor data source or internal data source device 110 may be used to provide an adaptor interface to receive and format the data units provided by the external data source 102 and act as an internal data source for the data transfer engine 100. For example, the adaptor data source 110 may accept data from one or more external data sources 102 and may arrange or format the data units to be stored in internal data buffers. For example, the data units may be formatted into uniform data units having variable data sizes and/or types. The example of such data structure is an array in MATLAB® by the Math-Works, Inc. of Natick, Mass. The MATLAB® array has a basic structure that represents the data in a uniform way, but the actual data may be of variable size and type. As another example, the data units may be formatted into data units having uniform size and structure, e.g. the data units may be identically sized and formatted.

Adaptor data source 110 may output or transfer full buffers 112 including data received from the external source 102 and formatted into a standard format to an engine or internal data sink, or internal data sink device 120 as described below.

The adaptor data source 110 may obtain empty buffers 122 by requesting 124 the empty buffers 122 from, for example, an empty buffer source 130. As described in detail below, the empty buffers 122 may be provided in several ways. For example, buffers, upon release 140 (e.g., when data is no longer needed), may be released back to the empty buffer source 130 by the internal data sink 120.

The internal data sink 120 may be coupled to an output data converter or converters 150. The output data converters 150 may be used to convert the buffer data into a specific format for a particular use at a destination or destinations, for example, for use in data processing or other software and/or systems, files, etc. Such destinations provide an external sink 160 for the data with respect to the data transfer engine 100.

The data transfer engine 100 may further include a controller 170 which may be implemented in hardware, software, or both. In general, controller 170 may provide control functionality to direct and control the components of the data transfer engine 100. Such functions may include, for example, but are not limited to, opening, closing, configuring, connecting, disconnecting, starting, stopping, etc.

Figure 2:
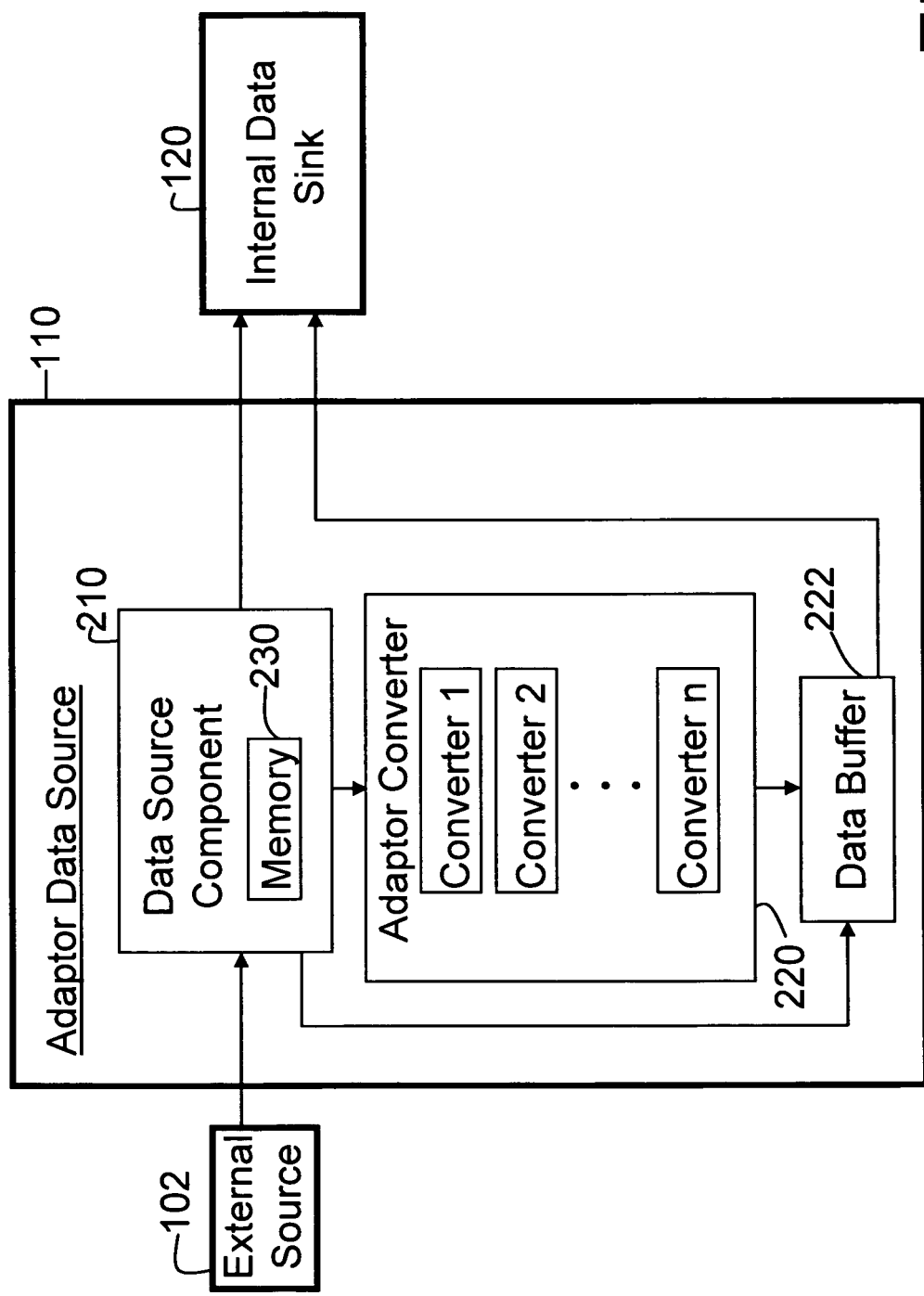
FIG. 2 is a diagrammatic illustration of a detailed portion of the data transfer system according to an exemplary embodiment of the invention.

With continuing reference to FIG. 1 and further reference to FIG. 2, in this implementation, adaptor data source 110 may include a data source component or components 210 and an adaptor converter or converters 220. The data source component 210 and adaptor converter 220 may be separate or integrated. The data source component 210 may accept data from one or more external data sources 102 and may arrange or format the data to be stored in internal data buffer or buffers 222. The data source component 210 may operate in an asynchronous or any other appropriate fashion. In one embodiment, the data source component 210 includes a memory 230 to at least temporarily store data. The adaptor converter 220 may be used to arrange, format and/or store the formatted data in the data buffers 222. The data buffers 222 may be of a uniform size and/or format, which may provide ease of data handling. The data buffers 222 may be locations in one or more larger memories (e.g., but not limited to, RAM, disk, etc.), or the data buffers 222 may correspond to discrete buffers (e.g., registers). To arrange or format data units into a uniform or standard size and/or format, the adaptor data source 110 may use customized adaptor converters 220 to handle different data formats from various external data sources 102. Adaptor data source 110 may output or transfer full buffers to the internal data sink 120 as described in detail below.

Figure 3:
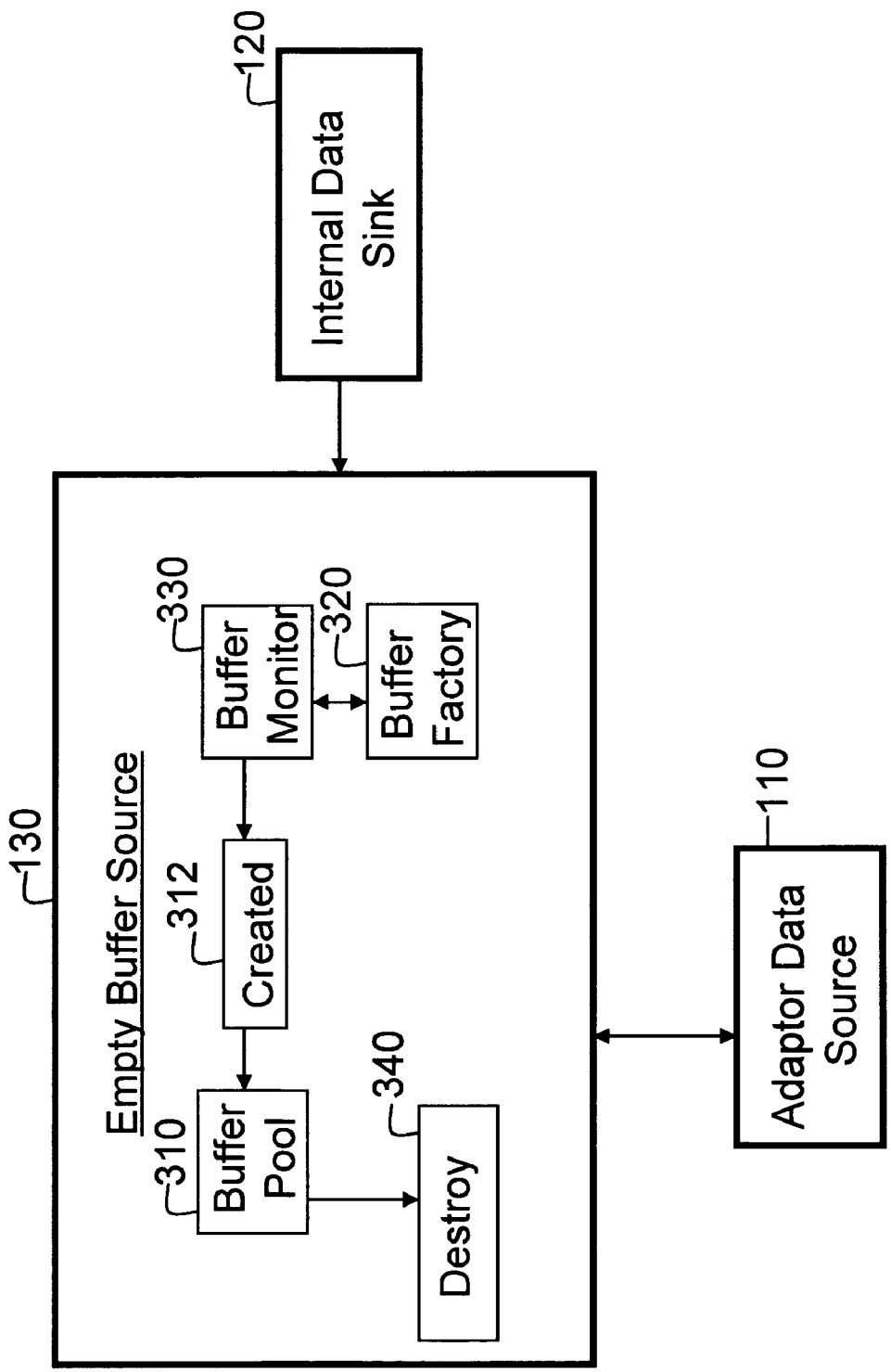
FIG. 3 is a diagrammatic illustration of a detailed portion of the data transfer system according to an exemplary embodiment of the invention.

With continuing reference to FIG. 1 and further reference to FIG. 3, the adaptor data source 110 may obtain empty buffers 122 by requesting the empty buffers 122 from, for example, the empty buffer source 130. Empty buffer source 130 may maintain a pool of available buffers 310 that may be furnished to adaptor data source 110 upon request. For example, when data is no longer needed, buffers may be released back into the buffer pool 310. As another example, the buffers can be generated or created 312 by a buffer generator or factory 320, for example, when there are not enough available buffers in the buffer pool 310. Such condition may, for example, be detected when a request for a buffer from adaptor data source 110 is received by buffer source 130. For example, the number of available buffers in the buffer pool 310 can be compared to a low predetermined number of buffers by a buffer monitor 330 (which may, for example, be set by a user and/or may be based on empirical data regarding the flow of data through the data transfer engine 100). Creation of buffers may involve allocation of memory space for use as data buffers, for example, which may include passing to buffer pool 310 a list of memory addresses that are ready to receive data. The above operations may be implemented, for example, by buffer factory 320 and buffer monitor 330, which may furnish the buffers to buffer pool 310 for provision to adaptor data source 110.

Buffer monitor 330 may also monitor buffer pool 310 to determine if the number of available buffers in buffer pool 310 rises above a high predetermined number of buffers. The high predetermined number of buffers may, for example, be user-set or determined empirically. When the number of buffers in buffer pool 310 exceeds the high predetermined number, buffer monitor 330 may destroy 340 some of the buffers, which may be done using buffer factory 320.

It is contemplated that at least some of the components of empty buffer source 130 may operate asynchronously. Such components may include, for example, but are not limited to, buffer monitor 330.

Figure 4:
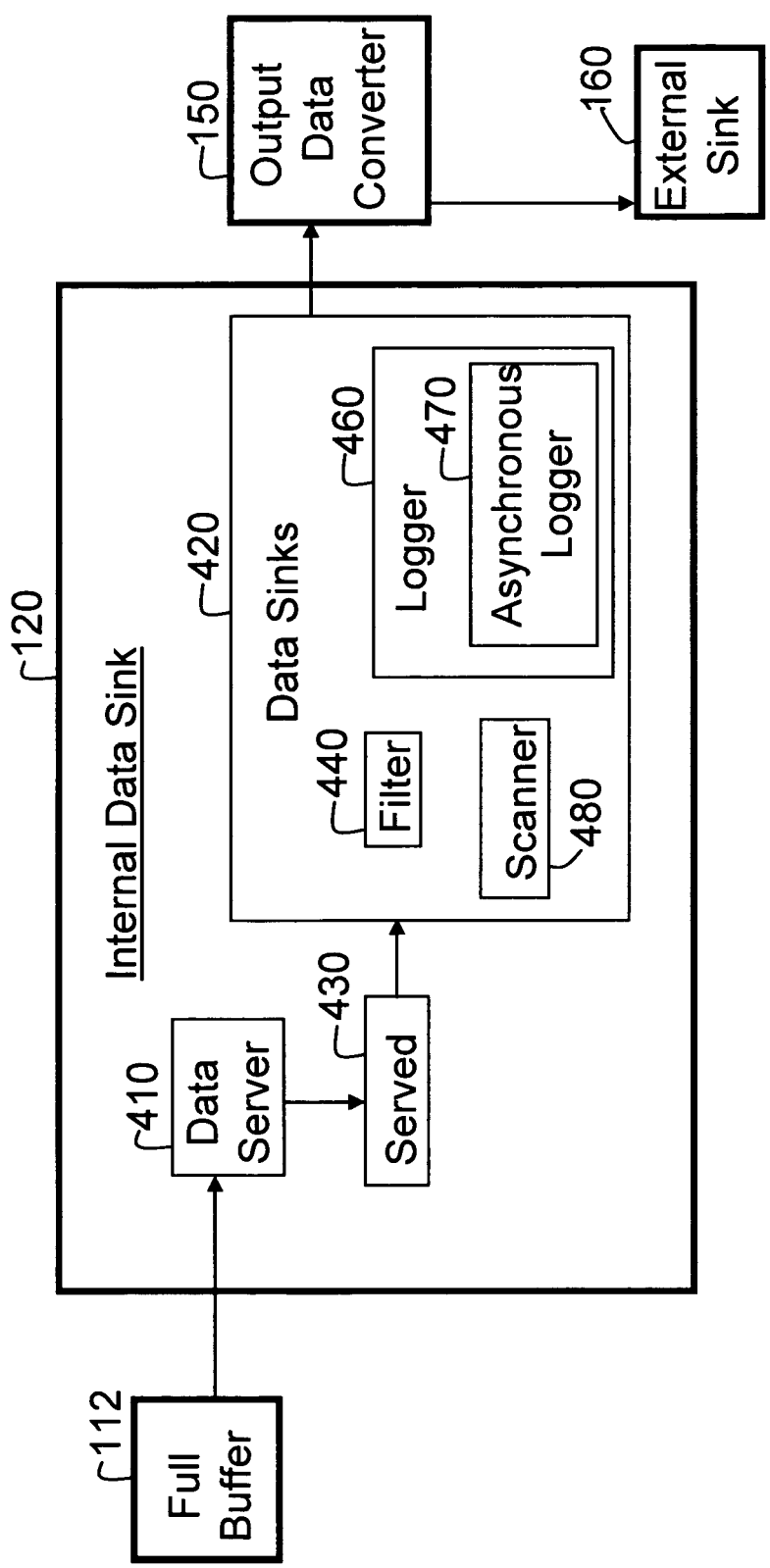
FIG. 4 is a diagrammatic illustration of a detailed portion of the data transfer system according to an exemplary embodiment of the invention.

With continuing reference to FIG. 1 and further reference to FIG. 4, buffers that have been filled with data, e.g., full buffers 112, may be furnished to the internal data sink 120. The internal data sink 120 may include a data server 410. Data server 410 may be implemented as described, for example, in U.S. patent application Ser. No. 10/671,703, identified above. Data server 410 may operate in an asynchronous fashion (but is not to be thus limited). Data server 410 may be used to receive full buffers 112 sent from adaptor data source 110. The data server 410 may furnish the full buffers 112 to various data sinks 420 of internal data sink 120. The data sinks 420 may be served 430, for example, in an order in which the data sinks 420 have been registered with the data server 410.

The data sinks 420 may be capable of being enabled and disabled. If disabled, the data sink 420 is not notified of a buffer arrival. In contrast, the enabled data sink 420 is notified of the arrival of the buffer and accept the buffer data. Enablement and disablement of data sinks 420 may be governed by one or more rules, which may relate to state of the data transfer engine 100 and/or the type or value of data being processed.

The data sinks 420 may include various types of data sinks, including filter(s) 440, logger(s) 460, which may include asynchronous logger(s) 470, and/or scanner(s) 480. The filter 440 may be used to alter the received buffer data, as for example to add the data to the buffer data. The logger 460 may be used to accumulate incoming data for later use (e.g., for forwarding data to an application). In general, the logger 460 may keep track of references to various data (as opposed to copies of the data), which may then be released after the data is no longer needed. If the asynchronous logger 470 is used, the data is processed asynchronously (e.g., on a separate thread), which may be useful for tasks that take large amounts of time. The scanner 480 may be used to scan data for some condition, which may be used to trigger an event and/or a state change. Although the buffer release may be done by the loggers 460, it is possible that other internal data sink devices may have some buffer release capability.

Figure 5:
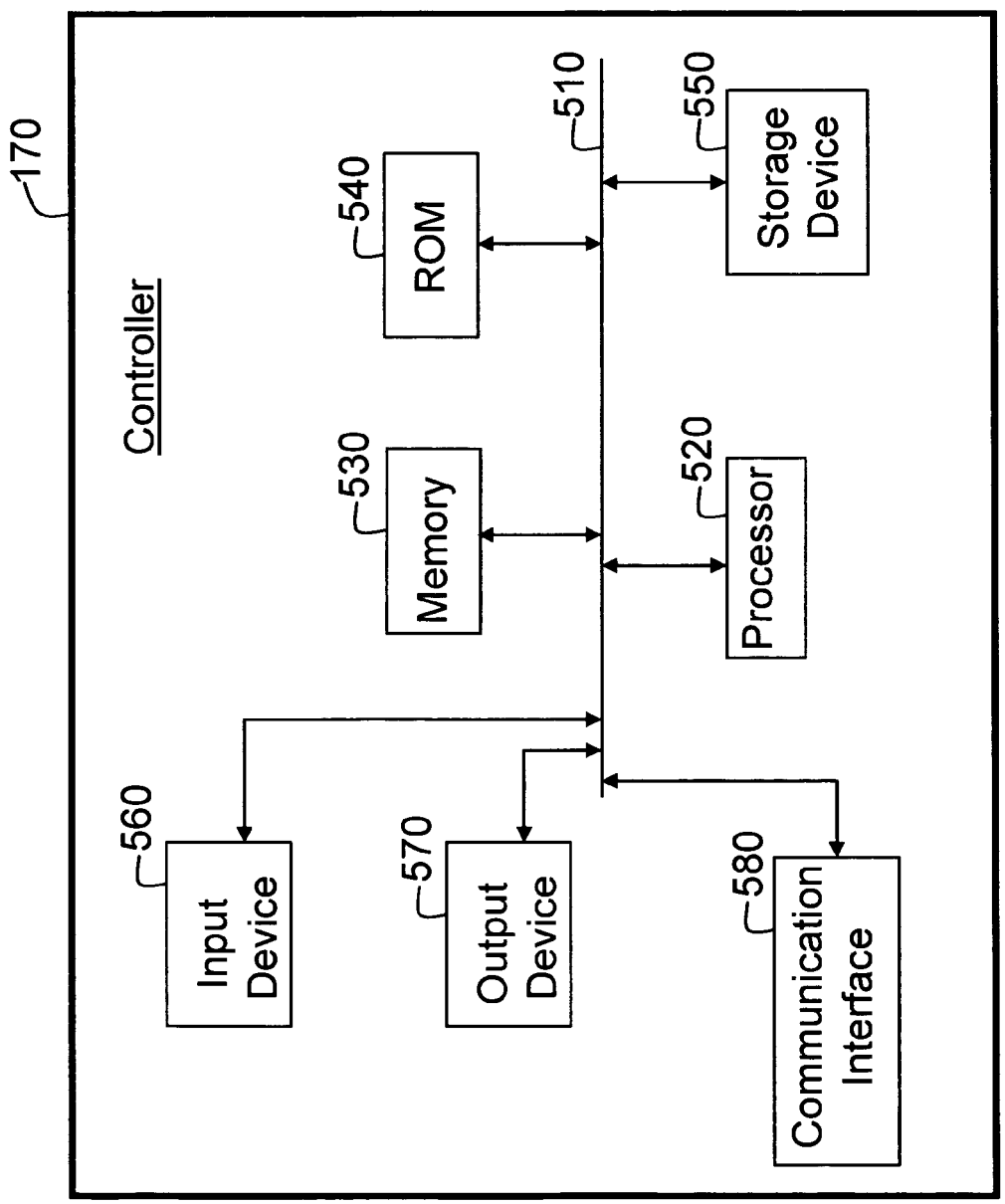
FIG. 5 is a diagrammatic illustration of a detailed portion of the data transfer system according to an exemplary embodiment of the invention.

With continuing reference to FIG. 1 and further reference to FIG. 5, the controller 170 may include a bus 510, a processor 520, a memory 530, a read only memory (ROM) 540, a storage device 550, an input device 560, an output device 570, and a communication interface 580.

Bus 510 may include one or more interconnects that permit communication among the components of the controller 170. Processor 520 may include any type of processor, microprocessor, or processing logic that may interpret and execute instructions (e.g., a field programmable gate array (FPGA)). Memory 530 may include a random access memory (RAM) or another type of dynamic storage device that may store information and instructions for execution by processor 520. Memory 530 may also be used to store temporary variables or other intermediate information during execution of instructions by processor 520.

ROM 540 may include a ROM device and/or another type of static storage device that may store static information and instructions for processor 520. Storage device 550 may include a magnetic disk and/or optical disk and its corresponding drive for storing information and/or instructions.

Input device 560 may include any mechanism or combination of mechanisms that permit an operator to input information to the controller 170, such as a keyboard, a mouse, a microphone, a pen-based pointing device, and/or a biometric input device, such as a voice recognition device and/or a finger print scanning device. Output device 570 may include any mechanism or combination of mechanisms that outputs information to the operator, including a display, a printer, a speaker, etc.

Communication interface 580 may include any transceiver-like mechanism that enables the controller 170 to communicate with other devices and/or systems, such as client computers. For example, communication interface 580 may include one or more interfaces. Alternatively, communication interface 580 may include other mechanisms for communicating via a network, such as a wireless network.

Controller 170 may perform certain functions in response to processor 520 executing software instructions contained in the computer-readable medium, such as memory 530. A memory may include one or more memory devices. In alternative embodiments, hardwired circuitry may be used in place of or in combination with software instructions. Thus, implementations consistent with principles of the application are not limited to any specific combination of hardware circuitry and software.

Figure 6:
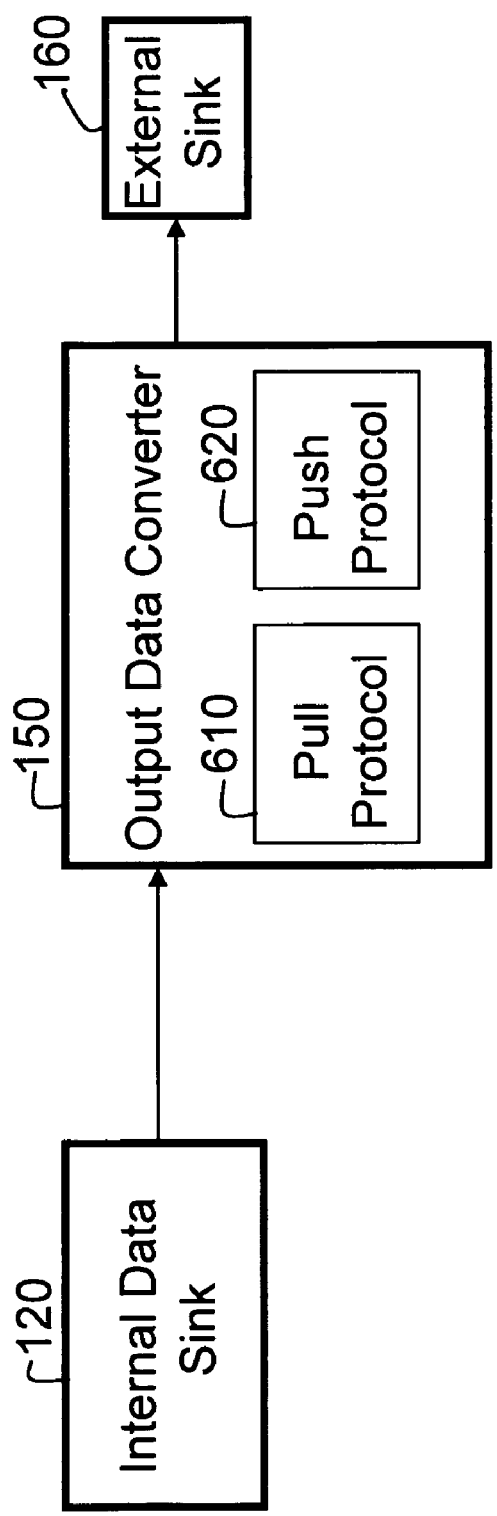
FIG. 6 is a diagrammatic illustration of a detailed portion of the data transfer system according to an exemplary embodiment of the invention.

With continuing reference to FIG. 1 and further reference to FIG. 6, the output data converters 150 may be registered with the internal data sink 120 to receive data from the internal data sink 120. The output data converters 150 may be used to convert buffer data into a specific format for a particular use in the external data sink 160. Examples of the external data sinks 160 include data processing or other software and/or systems, files, and the like. The output data converters 150 may be designed to support communication of data to the external sink 160 using pull and/or push data transfer protocols 610, 620.

Figure 7:
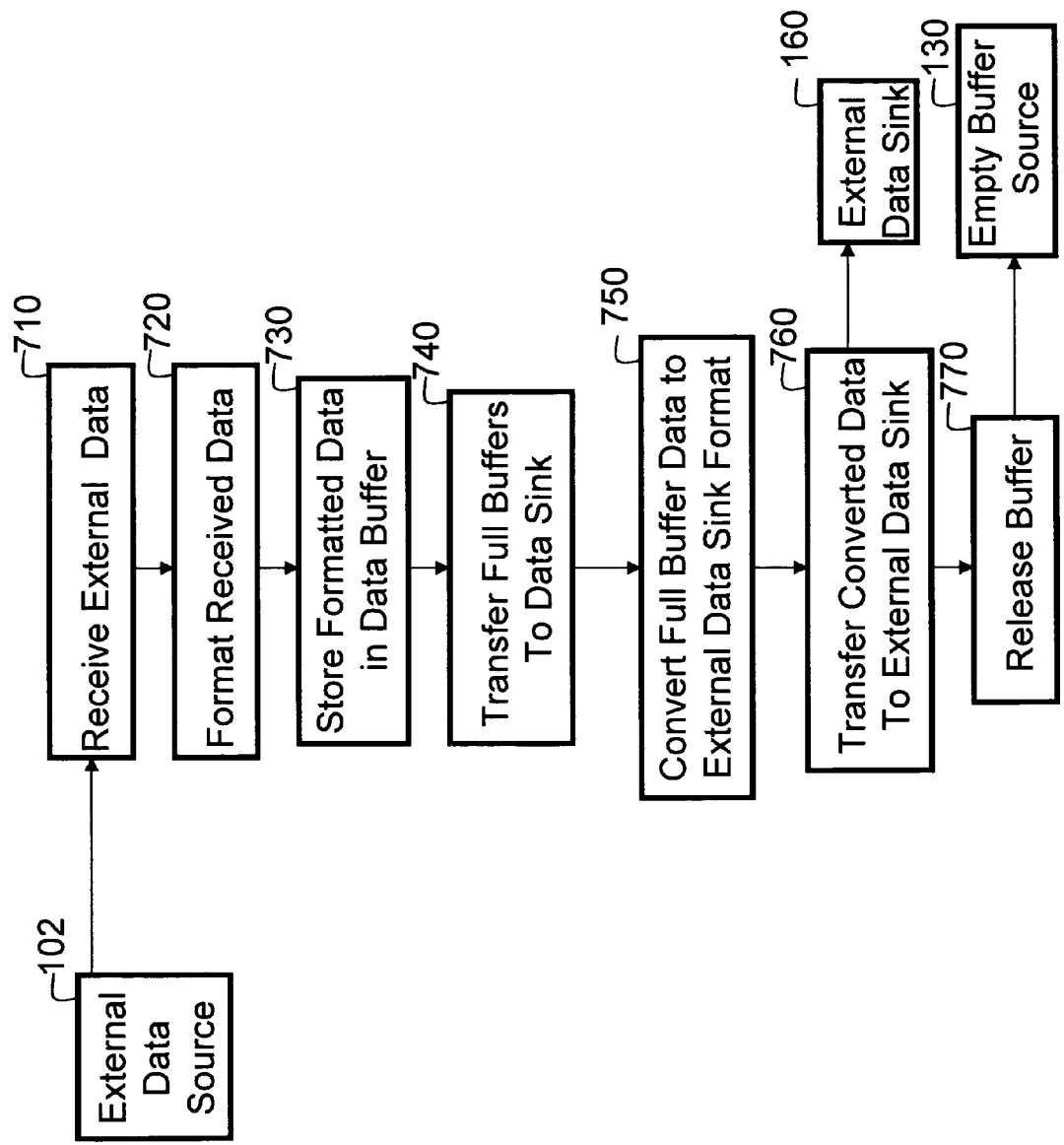
FIG. 7 is a flow chart of an exemplary data transfer in the data transfer system of FIG. 1 according to an exemplary embodiment of the invention.

With continuing reference to FIG. 1 and further reference to FIG. 7, the data from the external data source 102 is received 710 and optionally formatted 720. The formatted data is stored 730 in the data buffer. The adaptor data source 110 may output or transfer 740 full buffers 112 including data received from one or more external sources 102 and formatted into a standard format to the internal data sink 120. The output data converters 150 may convert 750 data of the full buffer into an external data sink compatible format. When the data is transferred 760 to the external data sink 160, the internal data sink 120 may release 770 the data buffer to the empty buffer source 130.

Figure 8:
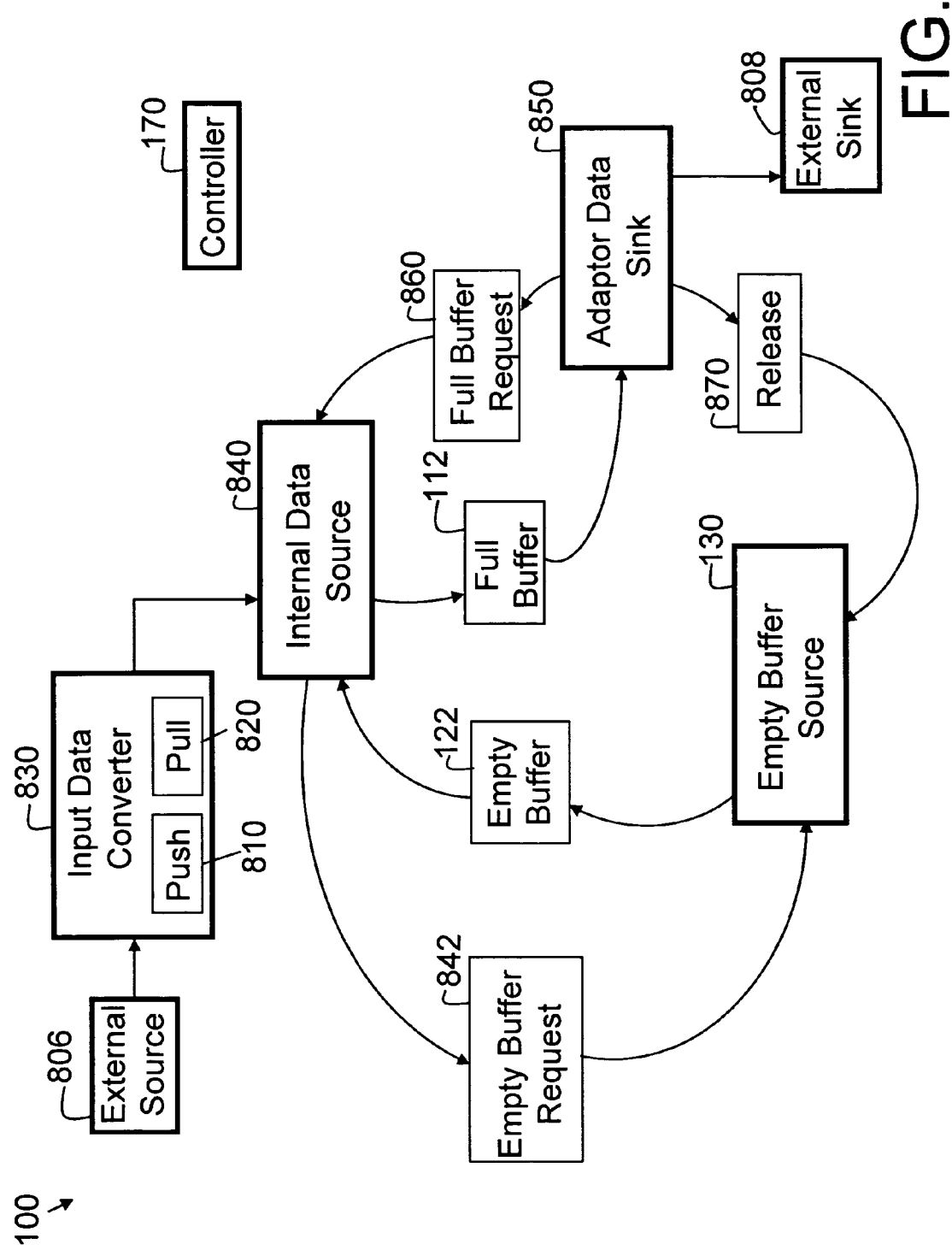
FIG. 8 is a diagrammatic illustration of another example of an exemplary data transfer system according to an exemplary embodiment of the invention.

With reference to FIG. 8, in this exemplary embodiment of the data transfer engine 100, data may be obtained from various data sources 806 and processed for forwarding to an external data sink 808, while the embodiment of FIG. 1 describes how data may be obtained from the external source 102 and processed for forwarding to various desired data sinks 160. The embodiments of FIGS. 1 and 8 may be collocated and/or combined into a single data transfer engine, or may be implemented separately, either completely or partially (i.e., they may share one or more components but otherwise be separate). The data transfer engine 100 depicted in FIG. 8 may be viewed, for example, as performing a function that can be substantially opposite to a function performed by the embodiment depicted in FIG. 1.

With continuing reference to FIG. 8, data, comprising a plurality of data units, may be transferred via push and/or pull protocols 810, 820, from the external data sources 806 including various applications/data sources to an input data converter or converters 830. The input data converter 830 may be used to convert and transfer the data from the external data sources 806 to an engine or internal data source, or internal data source device 840 of the data transfer engine 100. The internal data source 840 may be considered to act as a data source with respect to the other components of the data transfer engine 100. The internal data source 840 may request 842 empty buffers 122, as needed, from the empty buffer source 130 as discussed above. The internal data source 840 may format the data units similar to the formatting of the data units by the adaptor data source 110 as discussed in relation to FIG. 1 above. The internal data source 840 may store the data units in the data buffers and provide full buffers 112 to an adaptor data sink or data sink device 850 upon request 860. This may be thought of as being a pull-type data protocol. Such a protocol may be particularly useful when interfacing with external data sinks that are asynchronous. The adaptor data sink 850 may provide the data of the full buffer to the external data sink 808. The available buffers may be released 870 to the empty buffer source 130. Similarly to the embodiment of FIG. 1, the controller 170 may provide control functionality to control and/or direct one or more components of the data transfer engine 100.

Figure 9:
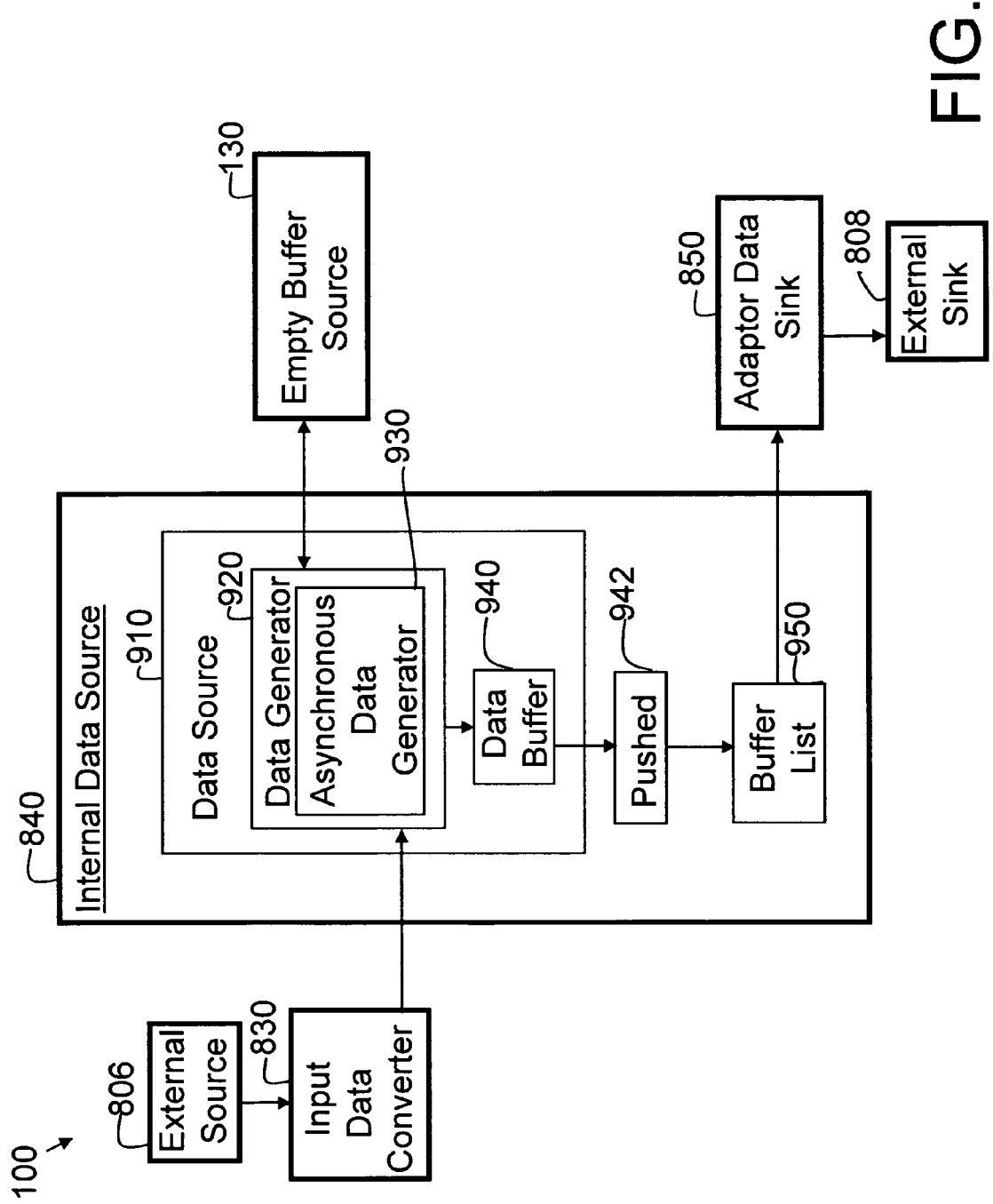
FIG. 9 is a diagrammatic illustration of a detailed portion of the data transfer system according to an exemplary embodiment of the invention.

With continuing reference to FIG. 8 and further reference to FIG. 9, the internal data source 840 may include data source or sources 910, which may include a data generator or generators 920, some of which may be asynchronous data generators 930. The data generators 920, 930 may request empty buffers 122, as needed, from empty buffer source 130.

The data generator 920 may be used to take data that is pushed to the internal data source 840 via the input data converter 830, format the data units into a first data format and store the formatted data units in a data buffer 940. The asynchronous data generator 930 may perform formatting by pulling data from the external data source 102 (e.g., a file) to be converted by the input data converter 830 and may then format the pulled data and store the formatted data in the data buffer 940. Another type of asynchronous data generator may generate data according to some rule (e.g., data corresponding to a signal having predetermined characteristics, such as amplitude, frequency, and duration) and format that data for transfer by the data transfer engine 100.

The data source 910 may then push 942 full buffers for storage in a buffer list 950. Buffer list 950 may provide full buffers to the adaptor data sink 850 upon request.

Figure 10:
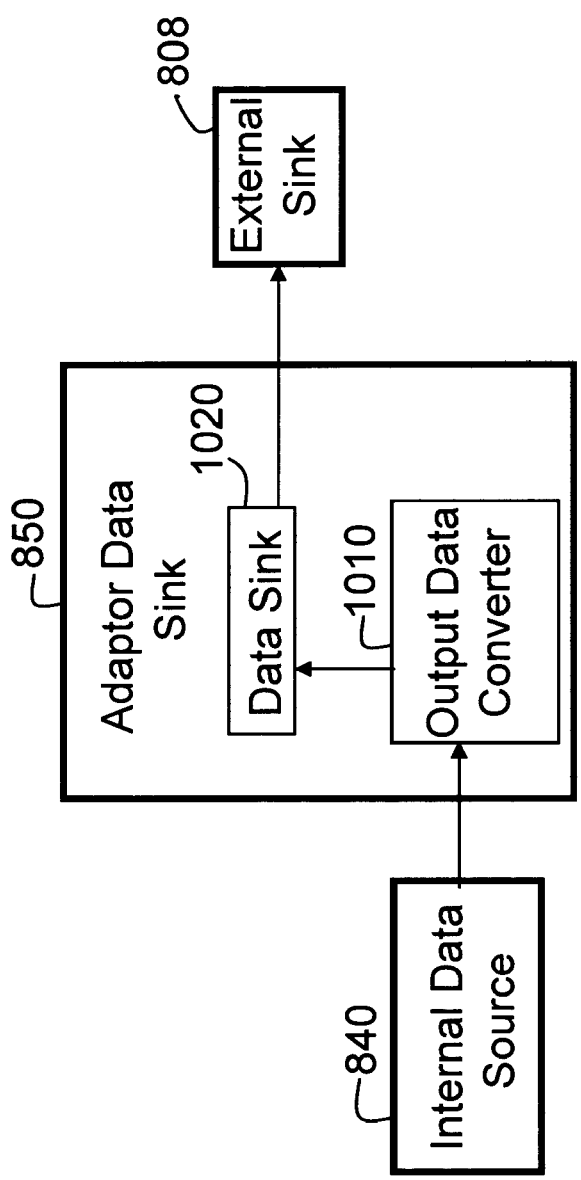
FIG. 10 is a diagrammatic illustration of a detailed portion of the data transfer system according to an exemplary embodiment of the invention.

With continuing reference to FIG. 8 and further reference to FIG. 10, the adaptor data sink 850 may include an output data converter or converters 1010 and/or a data sink or sinks 1020. For example, the output data converter 1010 may be used to convert data from the uniform data format to a different format and/or size for use by the external data sink 808. The converted data may be sent to the data sink 1020 internal to adaptor data sink 850, which may then interface with the external data sink 808 (e.g., hardware, files, sockets, etc., but not limited to these examples). Data sink 1020 may operate in an asynchronous fashion (but is not to be thus limited). When adaptor data sink 850 transfers the data to the external data sink 808, the buffer that stored the data may be released and may thus be made available for subsequent data storage.

Figure 11:
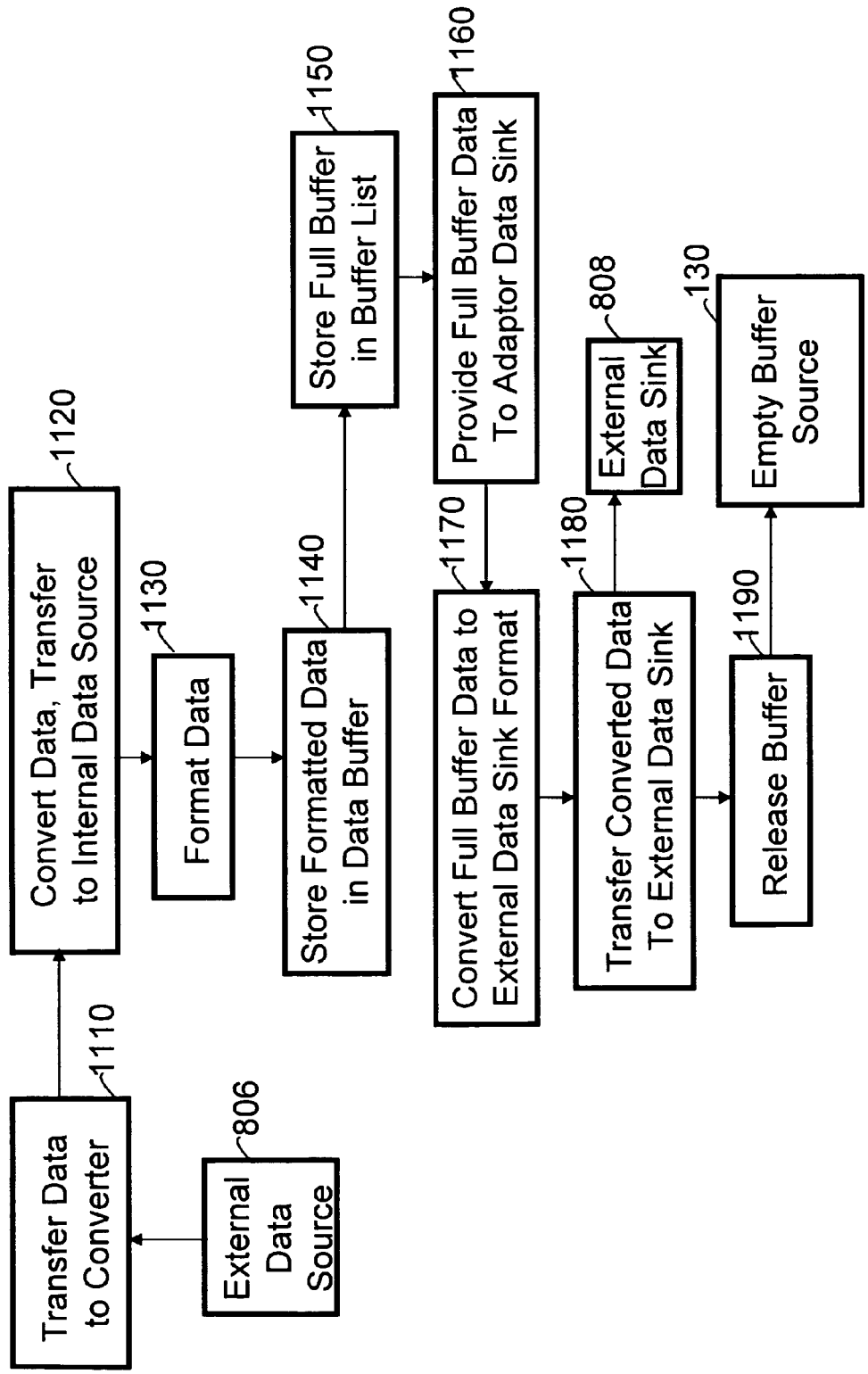
FIG. 11 is a flow chart of an exemplary data transfer in the data transfer system of FIG. 8 according to an exemplary embodiment of the invention.

With continuing reference to FIG. 8 and further reference to FIG. 11, data may be transferred 1110 to the input data converter 830. The input data converter 830 may convert and transfer 1120 the data to the internal data source 840 of the data transfer engine 100. The data is formatted 1130 and stored 1140 in the data buffer 940. The full buffers are stored 1150 in the buffer list 950. Buffer list 950 provides 1160 full buffers to the adaptor data sink 850.

The data in the uniform data format may be converted 1170 to a different format and/or size for use by the external data sink 808, and further transferred 1180 to the external data sink 808. The buffer that stored the data may be released 1190 to the empty buffer source 130, and may thus be made available for subsequent data storage.

Figure 12:
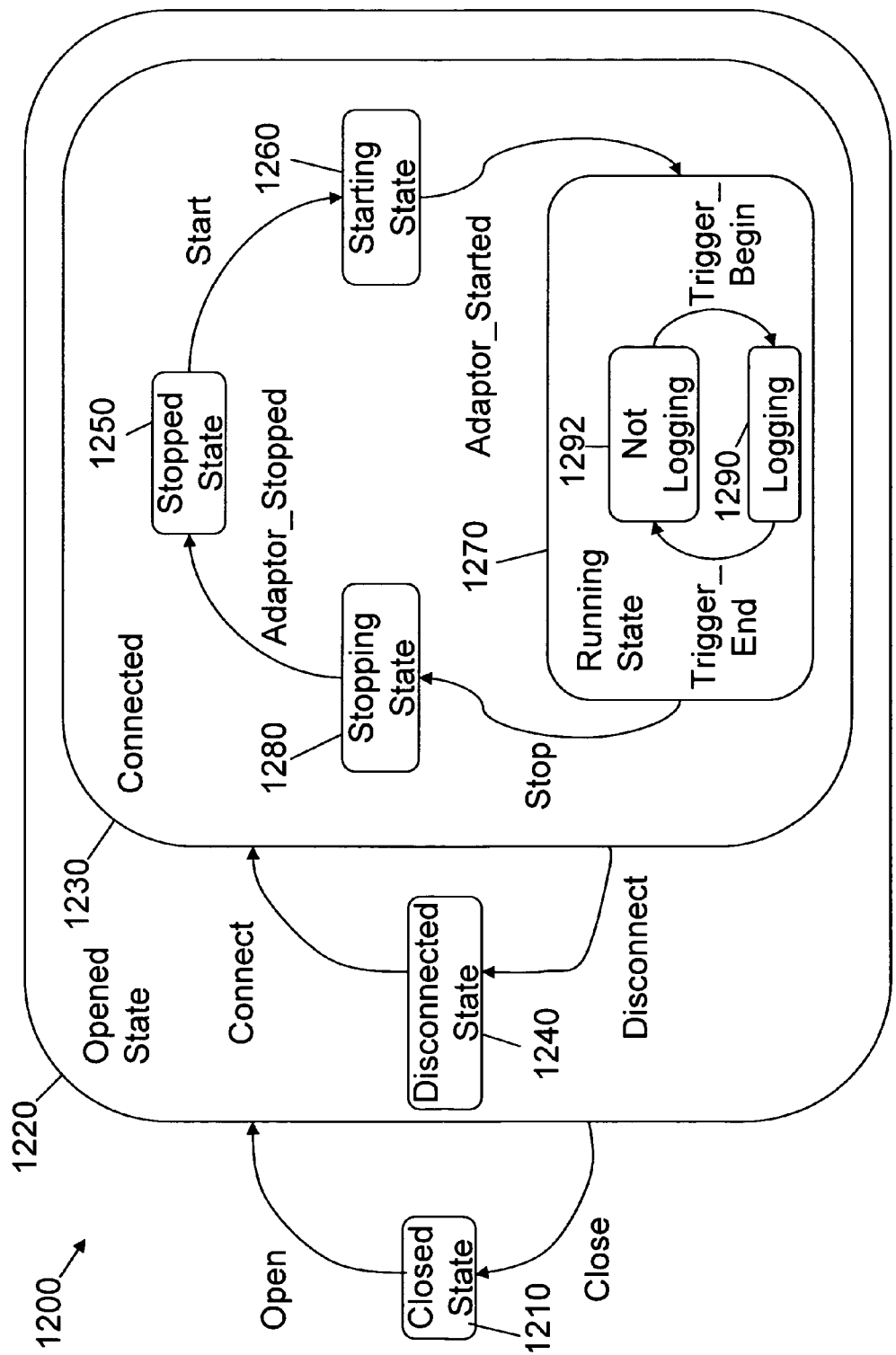
FIG. 12 is an exemplary state diagram for implementing a controller according to an exemplary embodiment of the invention.

With reference again to FIGS. 1 and 4 and further reference to FIG. 12, the controller 170 may be implemented, for example, in the form of a state machine. A state diagram 1200 of the exemplary controller 170 may include two sub-states, Closed 1210 and Opened 1220. The Opened state 1220 may include two sub-states, Connected 1230 and Disconnected 1240. The Connected state 1230 may include four sub-states, Stopped 1250, Starting 1260, Running 1270, and Stopping 1280. Finally, the Running state 1270 may include two sub-states, Logging 1290 and Not Logging 1292.

Initially, upon start-up, the process depicted by the state diagram of FIG. 12 may begin in the Closed state 1210. In the Closed state 1210, some initialization may occur, but the data transfer engine 100 may not yet be associated with the adaptor data source 110 and may not be configured. An Open event may lead to the process entering the Opened state 1220. Entry into the Opened state 1220 may be into the Disconnected state 1240. When the process has entered the Opened state 1220, the data transfer engine 100 may now be associated with the adaptor data source 110 and may be fully initialized. Additionally, the adaptor data source 110 may have also been initialized and connected to the external data source 102, as discussed above in connection with FIG. 1. Furthermore, in the Opened/Disconnected state 1220/1240, the data transfer engine 100 and the adaptor data source 110 may be configured as may be appropriate to a particular type of data acquisition. From the Opened state 1220, a Close event may lead back to the Closed state 1210. A Close event may be triggered when the Disconnected state 1240 is re-entered, after the process has been in the Connected state 1230 (which may occur in response to a Disconnect event, as discussed below).

Within the Opened state 1220, a Connect event may lead into the Connected state 1230. Entry into the Connected state 1230 may be at the Stopped state 1250. In this state, the adaptor data source 110 may be connected to the external data source 102. In some embodiments, no other engine may be connected to the same external data source. In some embodiments, additional configuration may be performed in this state. From the Connected state 1230, a Disconnect event may lead back to the Disconnected state 1240. A Disconnect event may be triggered by re-entry of the sub-process within the Connected state 1230 back into the Stopped state 1250, as discussed below.

Within the Connected state 1230, a Start event may lead from the Stopped state 1250 to the Starting state 1260, from which an Adaptor_Started event may lead to the Running state 1270. In particular, in the Starting state 1260, the data transfer engine 100 may prepare to receive incoming data via the adaptor data source 110 and may provide a command for the adaptor data source 110 to begin acquiring data (which may trigger the Adaptor_Started event mentioned above). Entry into the Running state 1270 may be into the Not Logging state 1292. In the Not Logging state 1292, data may be collected by the adaptor data source 110 and forwarded to the internal data sink 120; however, in this state, none of the loggers 460 may be logging data. From the Running state 1270, a Stop event may lead to the Stopping state 1280, and from the Stopping state 1280, an Adaptor_Stopped event may lead back to the Stopped state 1250. In the Stopping state 1280, the data transfer engine 100 may prepare to stop receiving incoming data and may command the adaptor data source 110 to stop acquiring data (which may trigger the Adaptor-_Stopped event discussed above). In the Stopped state 1250, the adaptor data source 110 may have stopped acquiring data. Note that a Stop event may be triggered at any point during the Running state 1270.

Finally, within the Running state 1270, the process may go from the Not Logging state 1292 to the Logging state 1290 via a Trigger_Begin event, and from the Logging state 1290 to the Not Logging state 1292 via a Trigger_End event. In the Logging state 1290, one or more of loggers 460 may be enabled.

Figure 13:
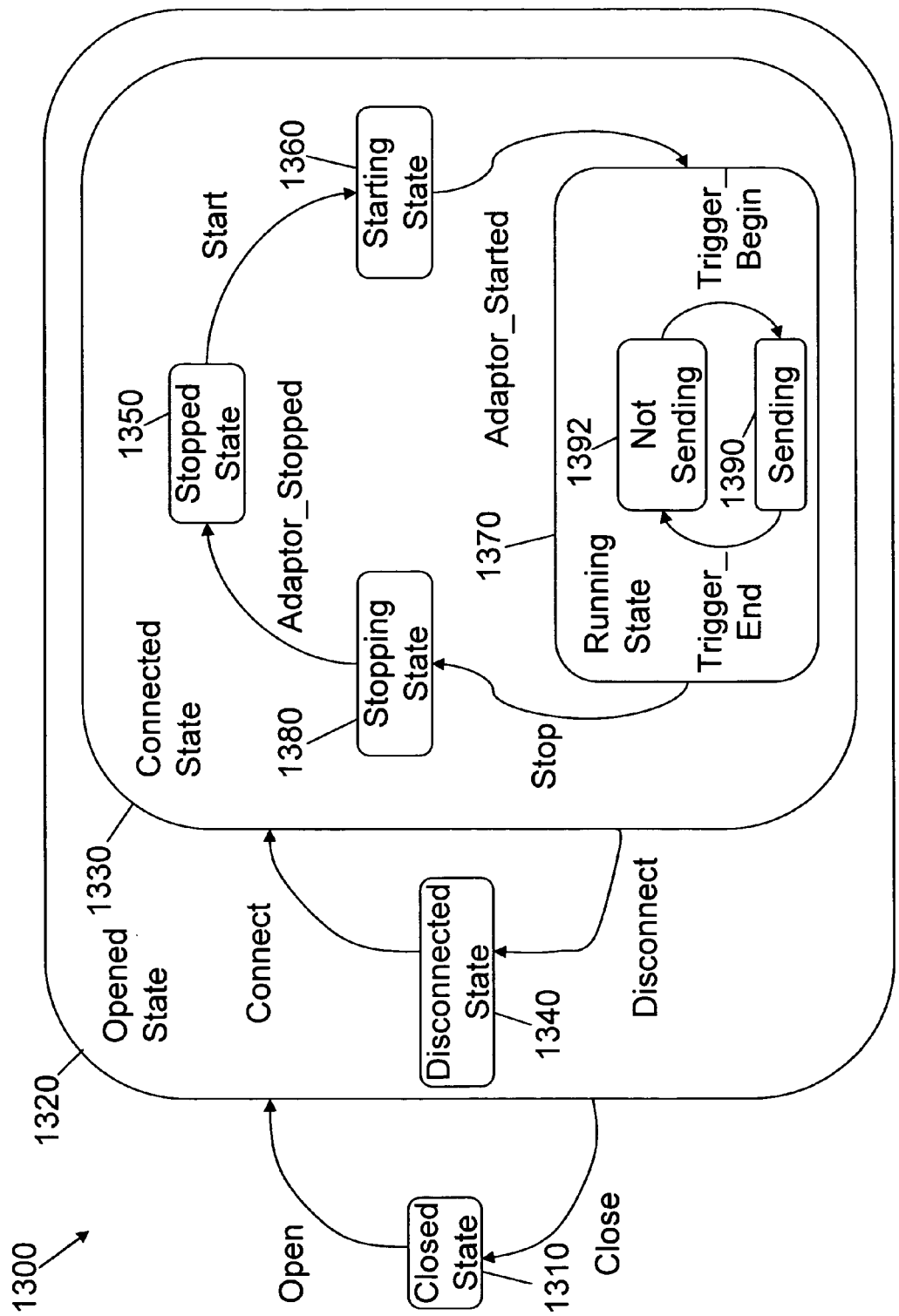
FIG. 13 is an exemplary state diagram for implementing a controller according to an exemplary embodiment of the invention.

With reference again to FIG. 8 and further reference to FIG. 13, an exemplary state diagram 1300 may be used to implement an exemplary controller 170. Similarly to the state diagram 1200 of FIG. 12, the state diagram 1300 may include two states, Closed 1310 and Opened 1320. The Opened state 1320 may include two sub-states, Connected 1330 and Disconnected 1340. The Connected state 1330 may include four sub-states, Stopped 1350, Starting 1360, Running 1370, and Stopping 1380. The Running state 1370 may include two sub-states, Sending 1390 and Not Sending 1392.

Initially, upon start-up, the process depicted by the state diagram 1300 may begin in the Closed state 1310. In the Closed state 1310, the data transfer engine 100 may not be fully initialized and may not yet be associated with the adaptor data sink 850. It may also not yet be configurable. An Open event may lead to the process entering the Opened state 1320. Entry into the Opened state 1320 may be into the Disconnected state 1340. In this state, communication may have been established with the adaptor data sink 850, and the data transfer engine 100 may be fully initialized. The adaptor data sink 850 may also now be fully initialized and prepared to connect with the external data sink 808. From the Opened state 1320, a Close event may lead back to the Closed state 1310. A Close event may be triggered when the Disconnected state 1340 is re-entered, after the process has been in the Connected state 1330 (which may be triggered by a Disconnect event, as discussed below).

Within the Opened state 1320, a Connect event may lead into the Connected state 1330. Entry into the Connected state 1330 may be at the Stopped state 1350. In the Stopped state 1350, the adaptor data sink 850 may have been connected to the external data sink 808. In some embodiments, no other data transfer engine may connect to the same external data sink. In some embodiments, additional configuration may be performed in this state. From the Connected state 1330, a Disconnect event may lead back to the Disconnected state 1340. A Disconnect event may be triggered, for example, by re-entry of the sub-process within the Connected state 1330 back into the Stopped state 1350.

Within the Connected state 1330, a Start event may lead from the Stopped state 1350 to the Starting state 1360, from which an Adaptor_Started event may lead to the Running state 1370. In the Starting state 1360, the data transfer engine 100 may prepare to send outgoing data to the adaptor data sink 850 and may have been fully initialized. An adaptor start command may trigger the Adaptor_Started event. Entry into the Running state 1370 may be into the Not Sending state 1392. From the Running state 1370, a Stop event may lead to the Stopping state 1380, and from the Stopping state 1380, an Adaptor_Stopped event may lead back to the Stopped state 1350. In the Stopping state 1380, the data transfer engine 100 may stop generating outgoing data and may generate a command for the adaptor data sink 850 to cease sending data to the external data sink 808 (this command may, in turn, trigger the Adaptor_Stopped event). A Stop event may be triggered at any point during the Running state 1370.

Finally, within the Running state 1370, the process may go from the Not Sending state 1392 to the Sending state 1390 via a Trigger_Begin event, and from the Sending state 1390 to the Not Sending state 1392 via a Trigger_End event. In the Not Sending state 1392, the data transfer engine 100 may prepare to send outgoing data to the adaptor data sink 850 and may command the adaptor data sink 850 to prepare to send data to the external data sink 808 to which it is connected. In the Sending state 1390, data may actually be sent to the external data sink 808 by the adaptor data sink 850.

Figure 14:
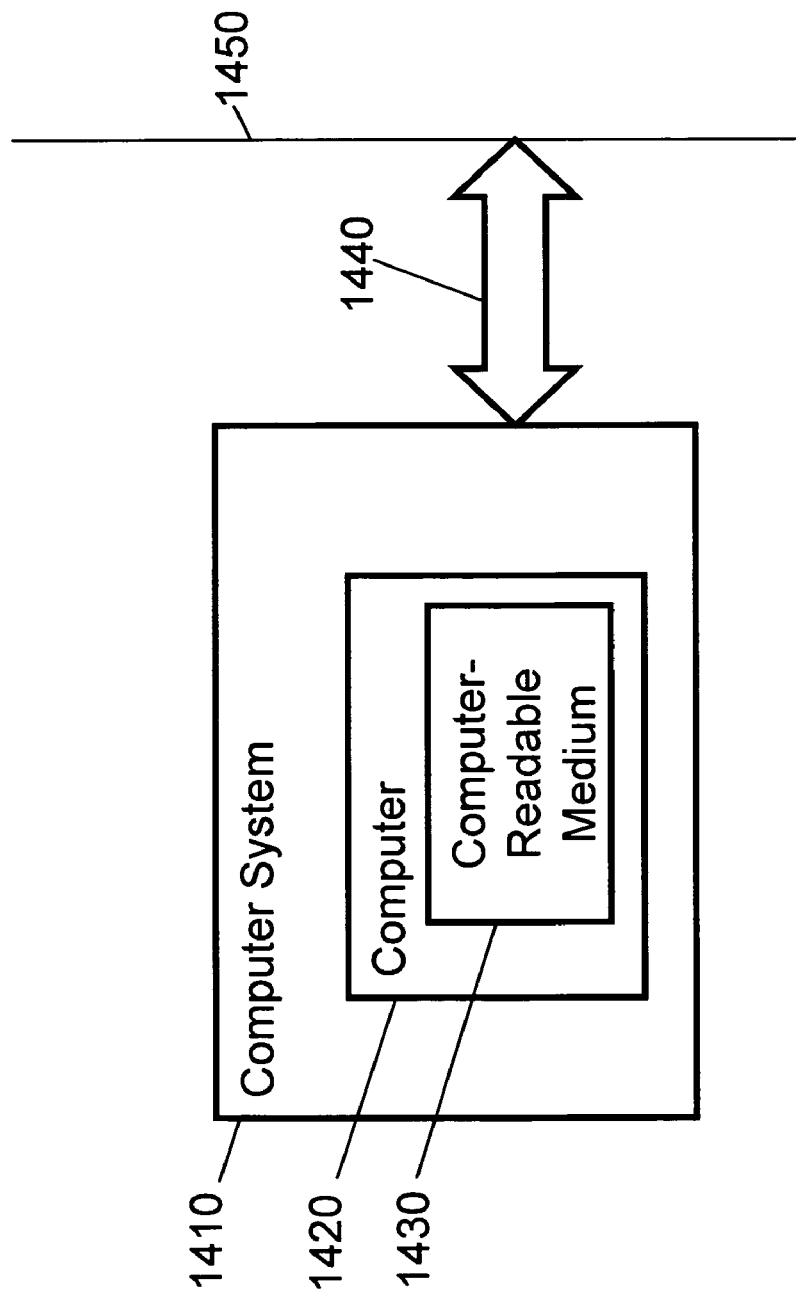
FIG. 14 is an exemplary computer system for implementing an exemplary data transfer engine according to exemplary embodiments of the invention.

With reference to FIG. 14, the exemplary embodiments of FIGS. 1 and 8 may be embodied as a computer system 1410 which may include a computer 1420. The computer 1420 may include a computer readable medium 1430 embodying software for implementing the systems and methods described herein to operate the computer 1420. Optionally, the computer system 1410 includes a connection 1440 to a network 1450 for the computer 1420 to send and receive information such as software, data, documents and the like from other computer systems.

The data transfer engine 100 may be embodied in many different ways as a software component. For example, it may be a stand-alone software package, or it may be a software package incorporated as a "tool" in a larger software product, such as, for example, a mathematical analysis product or a test generation product. It may be downloadable from a network, for example, a website, as a stand-alone product or as an add-in package for installation in an existing software application. It may also be available as a client-server software application, or as a web-enabled software application.

Of course, it is contemplated that the methods and systems discussed above may include multiple personal computer (PC) box implementations as well as other multiple device implementations. For example, implementations may include various numbers of PCs, instruments which can be PC-like devices that include data collection devices, and devices which can be other devices, for example, not having an operating system or not having a PC operating system. An example of such device is an XPC target box.

Connections between devices may be any type of connection, such as TCP/IP, or any appropriate type of communication bus.

With reference again to FIGS. 1 and 8, it is contemplated that each component of the data transfer engine 100 may be a separate device or some or all components can be a single integrated device. For example, in one embodiment, the data source device 110, 840, data sink device 120, 850 and controller 170 can be separate components. In another embodiment, data source device 110, 840, data sink device 120, 850 and controller 170 can be integrated into one device. In one embodiment, the external data sink 160, 808 comprises a data transfer engine similar to the data transfer engine 100 as described in the application.

Figure 15:
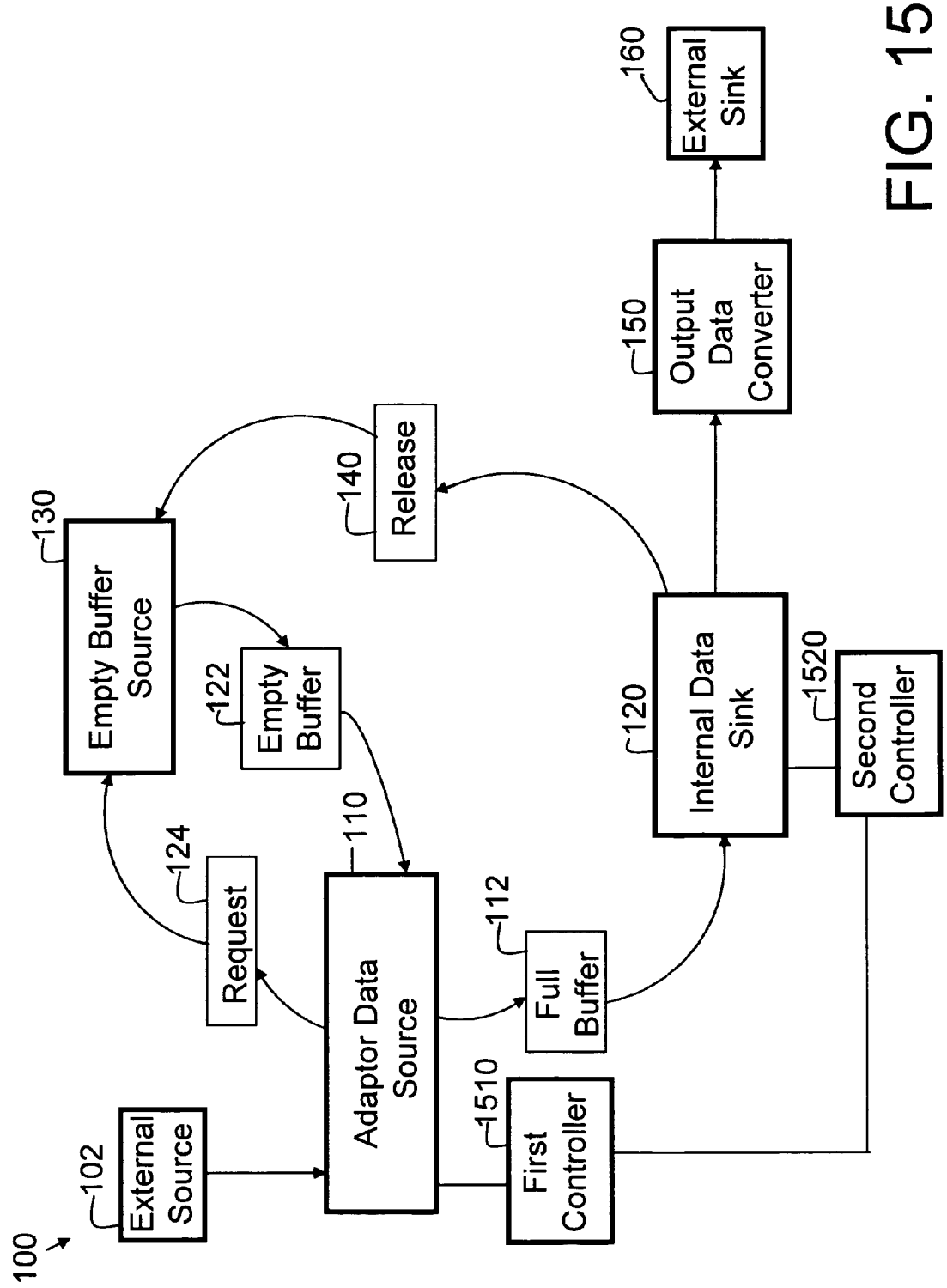
FIG. 15 is a diagrammatic illustration of an exemplary data transfer system according to an exemplary embodiment of the invention.

With reference to FIG. 15, multiple controllers such as first and second controllers 1510, 1520 can control one or more devices or components of the embodiment of FIG. 1. For example, the first controller 1510 may control the adaptor data source 110, while the second controller 1520 may control the internal data sink 120. The first and second controllers cooperate to control the data transfer in the data transfer engine 100. Optionally, the first and second controllers 1510, 1520 are operationally coupled to a centralized controller.

Figure 16:
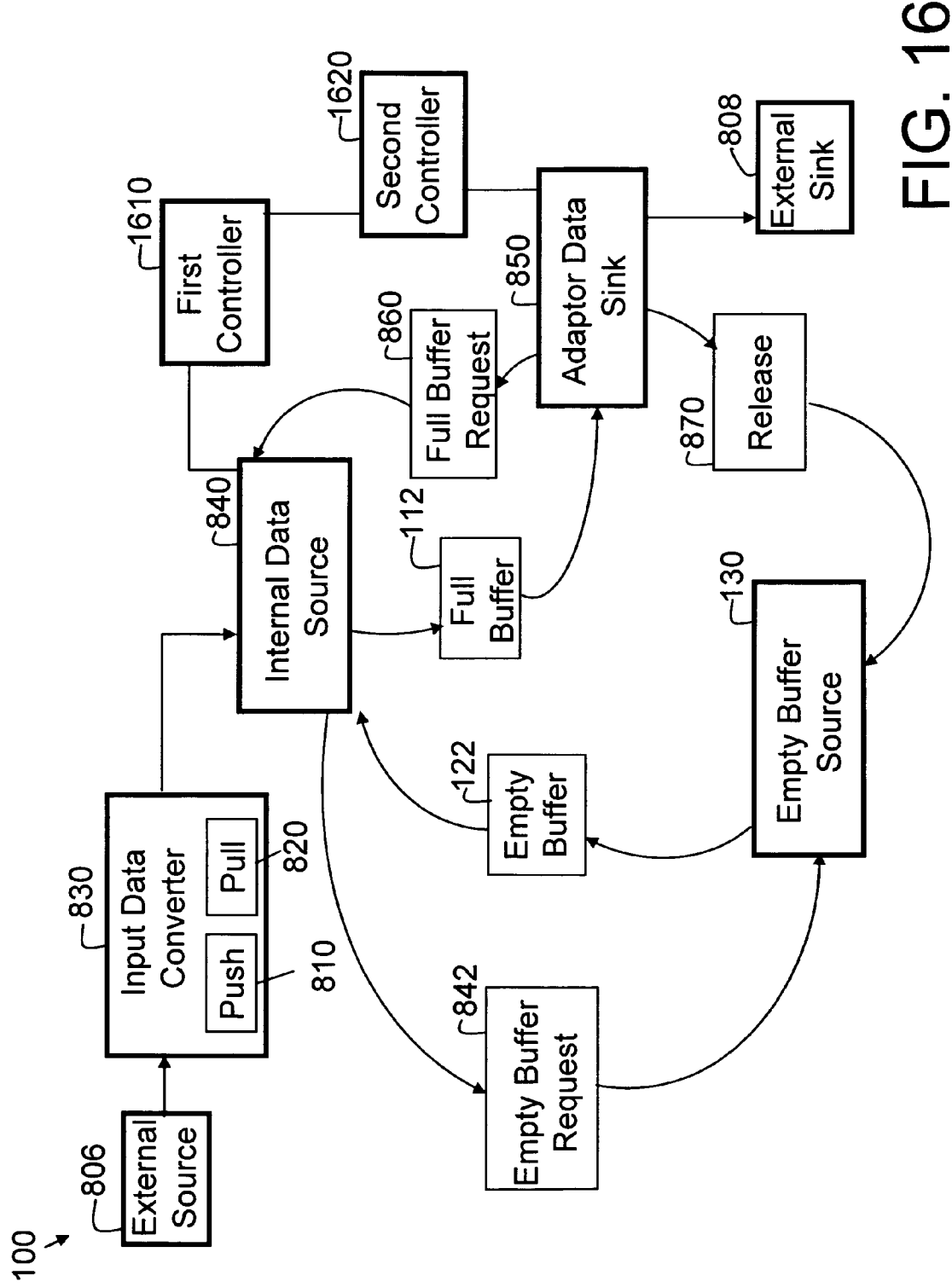
FIG. 16 is a diagrammatic illustration of an exemplary data transfer system according to an exemplary embodiment of the invention.

With reference to FIG. 16, multiple controllers such as first and second controllers 1610, 1620 can control one or more devices or components of the embodiment of FIG. 8. For example, the first controller 1610 may control the internal data source 840, while the second controller 1620 may control the adaptor data sink 850. The first and second controllers cooperate to control the data transfer in the data transfer engine 100. Optionally, the first and second controllers 1610, 1620 are operationally coupled to a centralized controller.

Generally, in the design of the devices and systems described above, any architectural structure can be utilized, such as multi core, multi device (e.g., distributed configurations), LAN events and the like.

Certain portions of the invention may be implemented as "logic" that performs one or more functions. This logic may include hardware, such as hardwired logic, an application specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

While various embodiments have been described above, it should be understood that they have been presented by way of example only, and not limitation. Thus, the breadth and scope of the described should not be limited by any of the above-described exemplary embodiments, but should instead be defined only in accordance with the following claims and their equivalents.

What is claimed is:

1. A computer-implemented method for transferring data, the method comprising:
   receiving data from an external source, the data comprising a plurality of units;
   formatting each unit of the data into a formatted data unit having a first format, wherein the first format is a uniform data format;
   requesting an empty buffer from an empty buffer source;
   querying a pool of available buffers;
   based on a predetermined criteria, determining a deficiency in the buffer pool;
   generating a new buffer based on the determined deficiency;
   forming a full buffer by storing the formatted data units in a data buffer;
   providing contents of the full buffer to an internal data sink;
   filtering the formatted data units of the full buffer;
   scanning the formatted data units of the full buffer for a predetermined condition;
   logging the formatted data units of the full buffer for subsequent use, wherein the internal data sink is configured to provide the formatted data units of the full buffer to a data converter, the data converter providing the formatted data units to one or more external data sinks in an associated external data sink compatible format; and
   releasing the data buffer whose formatted data units have been provided to the external data sink.

2. The method according to claim 1, wherein the formatted data unit is a uniform data unit.

3. The method according to claim 1, wherein the formatted data units comprise data having variable sizes or variable types.

4. The method according to claim 1, wherein the external data sink includes a data transfer engine.

5. A method for transferring data, comprising:
   downloading software to a computer system, which software, when executed by the computer system, causes the computer system to perform operations comprising the method of claim 1.

6. A method for transferring data, comprising:
   providing downloadable software to a computer system, which software, when executed by the computer system, causes the computer system to perform operations comprising the method of claim 1.

7. A non-transitory computer-readable medium comprising software that, when executed by a computer system, causes the computer system to perform operations for transferring data, the operations comprising:
   receiving data from an external data source, the data comprising a plurality of units;
   formatting each unit of the data into a formatted data unit having a first format, wherein the first format is a uniform data format;
   requesting an empty buffer from an empty buffer source;
   querying a pool of available buffers;
   based on a predetermined criteria, determining a deficiency in the buffer pool;
   generating a new buffer based on the determined deficiency;
   forming a full buffer by storing the formatted data units in a data buffer;
   providing contents of the full buffer to an internal data sink;
   filtering the formatted data units of the full buffer;
   scanning the formatted data units of the full buffer for a predetermined condition;
   logging the formatted data units of the full buffer for subsequent use, wherein the internal data sink is configured to provide the formatted data units of the full buffer to a data converter, the data converter providing the formatted data units to one or more external data sinks in an associated external data sink compatible format; and
   releasing the data buffer whose formatted data units have been provided to the external data sink.

8. The medium according to claim 7, wherein the formatted data unit is a uniform data unit.

9. The medium according to claim 7, wherein the formatted data units comprise data having variable sizes or variable types.

10. The medium according to claim 7, wherein the external data sink includes a data transfer engine.

11. A system comprising a computer and a computer-readable medium, the non-transitory computer-readable medium comprising software that, when executed by the computer, causes the computer to perform operations for transferring data, the operations comprising:
    receiving data from an external data source, the data comprising a plurality of units;
    formatting each unit of the data into a formatted data unit having a first format, wherein the first format is a uniform data format;
    requesting an empty buffer from an empty buffer source;
    querying a pool of available buffers;
    based on a predetermined criteria, determining a deficiency in the buffer pool;
    generating a new buffer based on the determined deficiency;
    forming a full buffer by storing the formatted data units in a data buffer;
    providing contents of the full buffer to an internal data sink;
    filtering the formatted data units of the full buffer;
    scanning the formatted data units of the full buffer for a predetermined condition;
    logging the formatted data units of the full buffer for subsequent use, wherein the internal data sink is configured to provide the formatted data units of the full buffer to a data converter, the data converter providing the formatted data units of the full buffer to one or more external data sinks in an associated external data sink compatible format; and
    releasing the data buffer whose formatted data units have been provided to the external data sink.

12. The system according to claim 11, wherein the formatted data unit is a uniform data unit.

13. The system according to claim 11, wherein the formatted data units comprise data having variable sizes or variable types.

14. The system according to claim 11, wherein the external data sink includes a data transfer engine.

15. A system for transferring data, the system comprising:
    means for receiving data from an external data source, the data comprising a plurality of units;

means for formatting each unit of the data into a formatted data unit having a first format, wherein the first format is a uniform data format;

means for requesting an empty buffer from an empty buffer source;

means for querying a pool of available buffers;

means for, based on a predetermined criteria, determining a deficiency in the buffer pool;

means for generating a new buffer based on the determined deficiency;

means for forming a full buffer by storing the formatted data units in a data buffer;

means for providing contents of the full buffer to an internal data sink;

means for filtering the formatted data units of the full buffer;

means for scanning the formatted data units of the full buffer for a predetermined condition;

means for logging the formatted data units of the full buffer for subsequent use, wherein the internal data sink is configured to provide the formatted data units of the full buffer to a data converter, the data converter providing the formatted data units to one or more external data sinks in an associated external data sink compatible format and means for releasing the data buffer whose formatted data units have been provided to the external data sink.

16. The system according to claim 15, wherein the formatted data unit is a uniform data unit.

17. The system according to claim 15, wherein the formatted data units comprise data having variable sizes or variable types.

18. The system according to claim 15, wherein the external data sink includes a data transfer engine.

19. A system for transferring data, the system comprising:
at least one processor adapted to process data;
an adaptor data source to, by the at least one processor, receive the data, the data comprising a plurality of data units from an external data source, format each data unit into a first format, wherein the first format is a uniform data format, request an empty buffer from an empty buffer source, and store the formatted data units in a data buffer to obtain a full buffer;
an internal data sink coupled to the adaptor data source to, by the at least one processor, receive the full buffer, the internal data sink comprising:
a filter to filter the formatted data units of the full buffer;
a scanner to scan the formatted data units of the full buffer for a predetermined condition; and
a logger to log the formatted data units of the full buffer for subsequent use, the internal data sink being adapted to release the data buffer when the formatted data units have been provided to the external data sink;
a data converter coupled to the internal data sink to, by the at least one processor, receive the formatted data units of the full buffer, the data converter converting the received formatted data units into an external data sink compatible format; and
the empty buffer source to, by the at least one processor, provide an empty buffer to the adaptor data source, the empty buffer source being adapted to, by the at least one processor:
query a pool of available buffers;
based on a predetermined criteria, determine a deficiency in the buffer pool; and
generate a new buffer based on the determined deficiency.

20. The system according to claim 19, wherein the formatted data unit is a uniform data unit.

21. The system according to claim 19, wherein the formatted data units comprise data having variable sizes or variable types.

22. The system according to claim 19, wherein the adaptor data source comprises:
a data source component to receive data comprising a plurality of units from the external data source; and
a converter to convert the data units into the first format.

23. The system according to claim 19, wherein the internal data sink comprises: a data server to receive and forward contents of the full buffer to a destination.

24. The system according to claim 23, wherein the destination includes a data transfer engine.

25. The system according to claim 19, further comprising: an asynchronous logger to log the data of the full buffer for subsequent use in an asynchronous manner.

26. The system according to claim 19, wherein the empty buffer source comprises: a buffer generator to generate the empty buffer.

27. The system according to claim 19, further comprising: a controller to control at least one of the adaptor data source or the internal data sink.

28. The system according to claim 27, wherein the controller comprises a state machine.

29. The system according to claim 19, further comprising: a first controller associated with the adaptor data source; and a second controller associated with the internal data sink, the first and second controllers cooperate to control data transfer in the data transferring system.

* * * * *